United States Patent
Reuterhage et al.

(10) Patent No.: US 10,086,585 B2
(45) Date of Patent: Oct. 2, 2018

(54) CARTON BOARD

(71) Applicant: BILLERUDKORSNÄS AB, Solna (SE)

(72) Inventors: Åke Reuterhage, Norrköping (SE); Anders Gåsste, Sunne (SE); Johan Byman, Karlstad (SE); Peter Bergström, Norrköping (SE)

(73) Assignee: BillerudKorsnäs AB, Solna (SE)

( * ) Notice: Subject to any disclaimer, the term of this patent is extended or adjusted under 35 U.S.C. 154(b) by 0 days.

(21) Appl. No.: 15/312,774

(22) PCT Filed: Jun. 8, 2015

(86) PCT No.: PCT/EP2015/062672
§ 371 (c)(1),
(2) Date: Nov. 21, 2016

(87) PCT Pub. No.: WO2015/189130
PCT Pub. Date: Dec. 17, 2015

(65) Prior Publication Data
US 2017/0182740 A1    Jun. 29, 2017

(30) Foreign Application Priority Data
Jun. 9, 2014  (EP) .................................... 14171649

(51) Int. Cl.
| B32B 7/12 | (2006.01) |
| B32B 7/02 | (2006.01) |
| B65D 65/40 | (2006.01) |
| D21H 11/08 | (2006.01) |
| B32B 29/06 | (2006.01) |
| B32B 29/00 | (2006.01) |
| B32B 9/06 | (2006.01) |

(52) U.S. Cl.
CPC .................. *B32B 7/12* (2013.01); *B32B 7/02* (2013.01); *B32B 29/005* (2013.01); *B32B 29/06* (2013.01); *B65D 65/40* (2013.01); *D21H 11/08* (2013.01); *B32B 9/06* (2013.01); *B32B 2250/26* (2013.01); *B32B 2255/12* (2013.01); *B32B 2307/50* (2013.01); *B32B 2307/54* (2013.01); *B32B 2307/75* (2013.01); *B32B 2439/62* (2013.01)

(58) Field of Classification Search
CPC ........... B32B 7/12; B32B 7/02; B32B 29/005; B32B 29/06; B32B 9/06; B32B 2250/26; B32B 2255/12; B32B 2307/50; B32B 2307/54; B32B 2307/75; B32B 2439/62; B65D 65/40; D21H 11/08
USPC ........................................................ 428/534
See application file for complete search history.

(56) References Cited

U.S. PATENT DOCUMENTS 5,916,417 A * 6/1999 Cassidy .................. D21F 11/04
162/125

FOREIGN PATENT DOCUMENTS

| EP | 1160379 | * 12/2001 |
| EP | 1160379 A2 | 12/2001 |
| WO | WO2006/084883 | * 8/2006 |
| WO | WO 2006/084883 A1 | 8/2006 |

OTHER PUBLICATIONS

International Search Report for PCT/EP2015/062672 dated Aug. 19, 2015.

* cited by examiner

Primary Examiner — Leszek Kiliman
(74) Attorney, Agent, or Firm — Myers Bigel, P.A.

(57) ABSTRACT

A paper laminate comprising a first stretchable paper layer, a second stretchable paper layer and an intermediate paper layer arranged between the first and the second stretchable paper layer, characterized in that the stretchability (ISO 1924/3) of the first and the second stretchable paper layer is at least 5% in both the machine direction (MD) and the cross direction (CD) and the stretchability (ISO 1924/3) of the intermediate paper layer is less than 4% in the MD and/or the CD.

15 Claims, 5 Drawing Sheets

CARTON BOARD

STATEMENT OF PRIORITY

This application is a 35 U.S.C. § 371 national phase application of PCT Application No. PCT/EP2015/062672 filed Jun. 8, 2015, which claims priority to European Application No. 14171649.8 filed Jun. 9, 2014, the entire contents of each of which is incorporated by reference herein.

TECHNICAL FIELD

The invention relates to carton board that may be embossed.

BACKGROUND

In many fields, it is generally desirable to replace petroleum-based plastics with a renewable material. One interesting alternative to the traditional plastics, in particular in the filed of packaging, is paper. However, paper is considerably less stretchable than many types of plastics. Consequently, traditional paper materials generally do not allow the formation of decorative or functional reliefs or bulges.

SUMMARY

The present inventors realized that paper of high stretchability is an interesting alternative to plastics in packaging applications. The stretchable paper is particularly interesting for packages having decorative or functional bulges or embossings/reliefs. However, the inventors have also realized that a material formed exclusively of highly stretchable paper may be associated with a number of drawbacks. Firstly, such a material may be less suitable in packaging applications because of the relatively low stiffness and dimensional stability of stretchable paper compared to traditional paper board. Further, it may be difficult to provide the stretchable material with folding lines giving exact and straight edges in folded packages. Therefore, the inventors developed a new type of paper laminate having stretchable outer layers and an intermediate layer of less stretchability. The intermediate layer is designed to at least partly break when the new laminate is provided with folding lines, while the outer layers are designed to stretch and thus hold the laminate together at the folding lines. Further, the stretchable outer layers allow formation of reliefs in the laminate, e.g. by embossing, such that it can compete with plastics.

The following is an itemized listing of embodiments of the present disclosure.

1. A paper laminate comprising a first stretchable paper layer, a second stretchable paper layer and an intermediate paper layer arranged between the first and the second stretchable paper layer, characterized in that the stretchability (ISO 1924/3) of the first and the second stretchable paper layer is at least 5% in both the machine direction (MD) and the cross direction (CD) and the stretchability (ISO 1924/3) of the intermediate paper layer is less than 4% in the MD and/or the CD.

2. The paper laminate according to item 1, wherein the stretchability of the first and the second stretchable paper layer is at least 6 or 7% in both the MD and the CD.

3. The paper laminate according to any one of items 1-2, wherein the stretchability of the intermediate paper layer is less than 3 or 2% in the MD and/or the CD.

4. The paper laminate according to any one of items 1-3, wherein the density (ISO 534) of the intermediate paper layer is less than 0.8 g/cm$^3$.

5. The paper laminate according to any one of items 1-4, wherein the grammage (ISO 536) of the intermediate paper layer is between 75 and 500 g/m$^2$, such as between 100 and 400 g/m$^2$, such as between 150 and 350 g/m$^2$.

6. The paper laminate according to any one of items 1-5, wherein the grammage (ISO 536) of the first stretchable paper layer is between 50 and 250 g/m$^2$, such as between 75 and 200 g/m$^2$.

7. The paper laminate according to any one of items 1-6, wherein the grammage (ISO 536) of the second stretchable paper layer is between 50 and 250 g/m$^2$, such as between 75 and 200 g/m$^2$.

8. The paper laminate according to any one of items 1-7, wherein an adhesive, such as a PE layer, a water-based glue or a organic solvent-based glue, is provided between the layers.

9. The paper laminate according to item 8, wherein the amount of adhesive provided between two layers is between 2 and 35 g/m$^2$, such as between 4 and 20 g/m$^2$.

10. The paper laminate according to any one of the preceding items, further comprising a layer of clay coating on at least one surface.

11. The paper laminate according to any one of the preceding items, wherein the intermediate layer is at least partly formed from pulp comprising mechanical pulp, thermomechanical pulp (TMP) or chemithermomechanical pulp (CTMP).

12. The paper laminate according to any one of the preceding items, wherein the internal bond strength (Tappi 569) of the intermediate layer is less than 300 J/m$^2$, such as less than 200 J/m$^2$.

13. The paper laminate according to any one of the preceding items, wherein the internal bond strength (Tappi 569) the first and the second stretchable paper layer is at least 400 J/m$^2$, such as at least 500 J/m$^2$, such as at least 600 J/m$^2$.

14. The paper laminate according to any one of the preceding items, wherein the geometric bending resistance (ISO 2493, bending angle=15°, test span length=50 mm) of the intermediate layer is at least 40 mN, such as at least 50 mN.

15. The paper laminate according to any one of the preceding items, wherein the bending resistance index (ISO 2493, bending angle=15°, test span length=50 mm) of the intermediate layer is at least 7 Nm$^6$/kg$^3$, such as at least 8 Nm$^6$/kg$^3$, such as at least 9 or 10 Nm$^6$/kg$^3$.

16. The paper laminate according to any one of the preceding items, wherein the geometric bending resistance (ISO 2493, bending angle=15°, test span length=50 mm) of the first and the second stretchable paper layer is less than 20 mN, such as less than 10 mN.

17. The paper laminate according to any one of the preceding items, wherein the bending resistance index (ISO 2493, bending angle=15°, test span length=50 mm) of the first and the second stretchable paper layer is less than 7 Nm$^6$/kg$^3$, such as less than 6 Nm$^6$/kg$^3$, such as less than 5 Nm$^6$/kg$^3$.

18. The paper laminate according to any one of the preceding items having a thickness (ISO 534) of 300-800 μm, such as 400-800 μm, and/or a grammage (ISO 536) of 300-700 g/m$^2$, such as 350-600 g/m$^2$.

19. A blank provided with folding lines, which blank is composed of the paper laminate according to any on of items 1-18.

20. A display product composed of the paper laminate according to any on of items 1-18.

21. A package comprising at least one wall composed of the paper laminate according to any on of items 1-18.

22. A package comprising at least two walls composed of the paper laminate according to any on of items 1-18, which walls are joined by an edge defined by a folding line formed in the paper laminate.

23. A box comprising a bottom wall and at least two side walls composed of the paper laminate according to any one of items 1-18.

24. The paper laminate, blank, display product, package or box according to any one of the preceding items comprising a bulge or relief formed by stretching a portion of the paper laminate.

25. The paper laminate, blank, display product, package or box according to 24, wherein the maximum height or the maximum depth of the bulge or relief is at least the same as the thickness of the paper laminate, such as at least 1.5 times the thickness of the paper laminate, such as at least 2 times the thickness of the paper laminate.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

Figure 1:
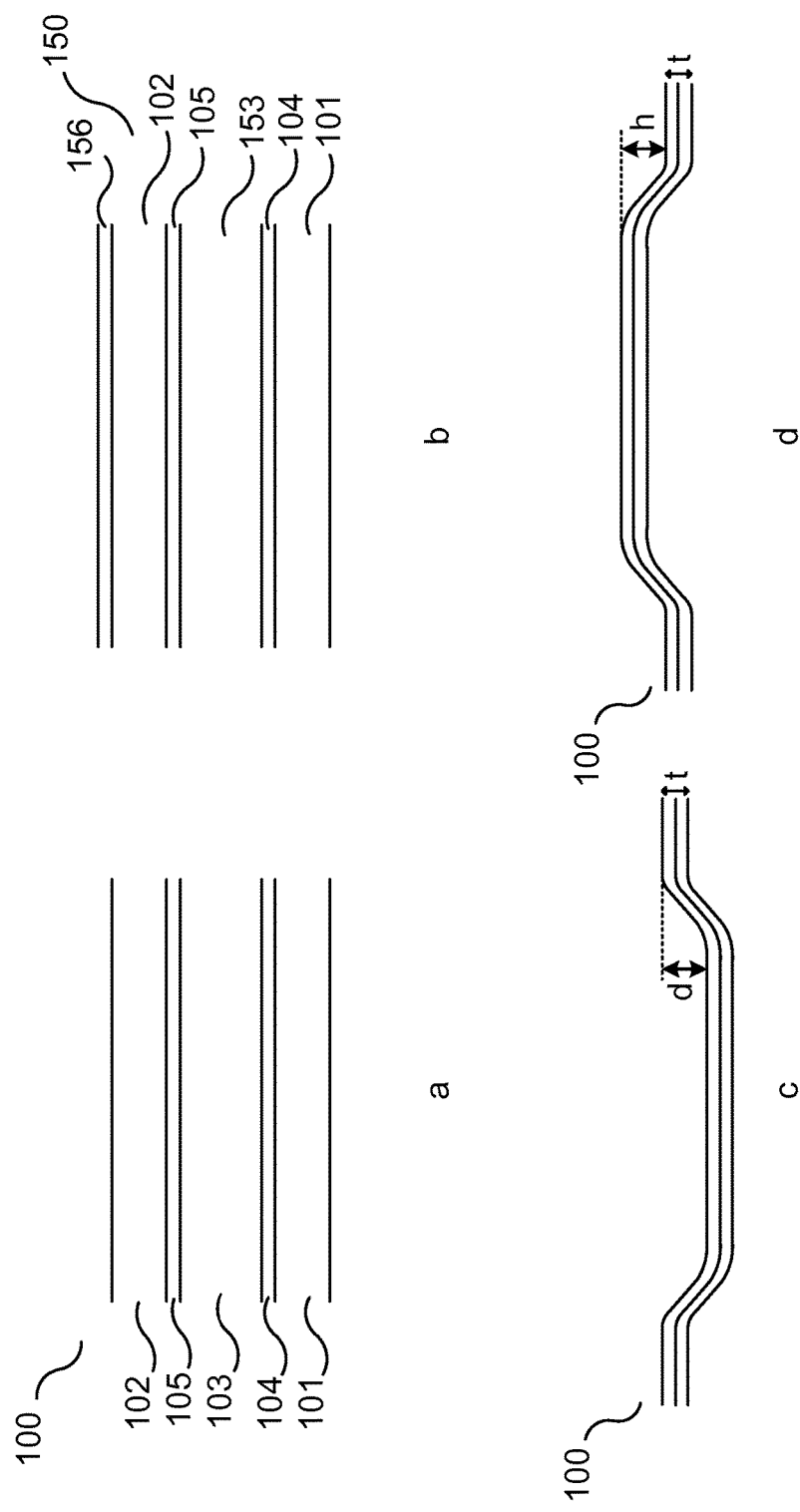
FIG. 1a-b illustrate cross-sections of embodiments of paper laminates according to the present disclosure.
FIG. 1c-d show how the maximum depth and height, respectively, of a relief is measured.

As a first aspect, there is thus provided a paper laminate comprising a first stretchable paper layer, a second stretchable paper layer and an intermediate paper layer arranged between the first and the second stretchable paper layer. The stretchability of the first and the second stretchable paper layer is at least 5% in both the machine direction (MD) and the cross direction (CD). In contrast, the stretchability of the intermediate paper layer is less than 4% in the MD and/or the CD. In the context of the present disclosure, stretchability is measured according to ISO 1924/3.

To allow deeper reliefs, the stretchability of the first and the second stretchable paper layer is preferably at least 6% in both the MD and the CD. In one embodiment, the stretchability of the stretchable paper layers is at least 7% in both the MD and the CD.

An example of a stretchable paper suitable for the first and the second stretchable paper layer of the present disclosure is FibreForm® marketed by BillerudKorsnäs AB (Sweden). In FibreForm®, the stretchability is at least 7% in the CD and at least 13% in the MD.

The stretchable paper layers and the intermediate layer have different functions in the laminate. For example, the internal bond strength of the stretchable paper layers is preferably higher than that of the intermediate paper layer. For example, the internal bond strength the first and the second stretchable paper layer may for example be at least 400 J/m$^2$, such as at least 500 J/m$^2$, such as at least 600 J/m$^2$, while the internal bond strength of the intermediate layer may be less than 300 J/m$^2$, such as less than 200 J/m$^2$ or less than 150 J/m$^2$. In the context of the present disclosure, internal bond strength is measured according to Tappi 569.

Higher internal bond strength may be obtained if the paper layer comprises longer fibres. Accordingly, the first and the second stretchable paper layer are preferably at least partly obtained from chemical pulp, which has longer fibres. For example, the first and the second stretchable paper layer may be composed of Kraft paper.

To give the laminate the desired properties, the intermediate paper layer is typically relatively bulky and stiff. Accordingly, the density (ISO 534) of the intermediate paper layer may for example be less than 0.8 g/cm$^3$. Further, the geometric bending resistance of the intermediate layer may be at least 40 mN, such as at least 50 mN, such as at least 60 mN, such as at least 70 mN. In the context of the present disclosure, the geometric bending resistance is measured according to ISO 2493 using a bending angle of 15° and a test span length of 50 mm. The measurement is preferably carried out using a bending tester from Lorentzen & Wettre.

The bending resistance of a layer depends on its grammage. To characterize the type of paper material selected for the intermediate layer, a bending resistance index may be calculated by dividing the geometric bending resistance with the cube of the grammage (the grammage is discussed below). Accordingly, the bending resistance index of the intermediate layer may for example be at least 7 Nm$^6$/kg$^3$, such as at least 8 Nm$^6$/kg$^3$, such as at least 9 or 10 Nm$^6$/kg$^3$.

The bending resistance of the stretchable paper layers is typically lower than that of the intermediate paper layer. For example, the geometric bending resistance of the first and the second stretchable paper layer is less than 20 mN, such as less than 10 mN. Further, the bending resistance index of the first and the second stretchable paper layer may be less than 7 Nm$^6$/kg$^3$, such as less than 6 Nm$^6$/kg$^3$, such as less than 5 Nm$^6$/kg$^3$.

The grammage of the intermediate paper layer is typically between 75 and 500 g/m$^2$, such as between 100 and 400 g/m$^2$, such as between 150 and 350 g/m$^2$. In the context of the present disclosure, the grammage is measured according to ISO 536. If the grammage is too low, the desired properties are not obtained. If it is too high, the laminate becomes too expensive.

The grammage of the intermediate layer is typically higher than the grammage of the first or the second stretchable paper layer.

The grammage of the first stretchable paper layer may for example be between 50 and 250 g/m$^2$, such as between 75 and 200 g/m$^2$. Likewise, the grammage of the second stretchable paper layer may be between 50 and 250 g/m$^2$, such as between 75 and 200 g/m$^2$.

The intermediate layer is selected to provide dimension stability and sheet flatness (stiffness and flatness are often correlated properties). Such properties are obtainable with the shorter fibres of mechanical pulp, thermomechanical pulp (TMP) or chemithermomechanical pulp (CTMP), which provides for higher bulk and an even distribution of fibres (low degree of flocculation).

Accordingly, the intermediate paper layer may be at least partly formed from pulp comprising mechanical pulp, TMP or CTMP. In one embodiment, at least 40%, such as at least 50%, such as at least 70%, of the pulp from which the intermediate layer is formed is mechanical pulp, TMP and/or CTMP. In some embodiments, the intermediate paper layer comprises two or more sublayers. Such sublayers may have different compositions.

In one embodiment, the intermediate layer comprises recycled fibres. In another embodiment, the intermediate layer is a liner or a fluting.

Adhesive may be provided in order to adhere the layers of the laminate to each other. For example, a layer of polyethylene (PE) may be provided between the first stretchable layer and the intermediate layer as well as between the second stretchable layer and the intermediate layer. The amount of PE between one of the stretchable layers and the intermediate layer may for example be 5-35 g/m$^2$, such as 10-20 g/m$^2$. The PE may be applied by means of extrusion. Alternatively, a water-based or organic solvent-based glue may be provided between the first stretchable layer and the intermediate layer as well as between the second stretchable layer and the intermediate layer. The amount of glue between one of the stretchable layers and the intermediate layer may for example be 2-15 g/m$^2$, such as 4-10 g/m$^2$.

In one embodiment, a surface of the paper laminate is provided with a layer of clay or pigment coating. This surface may for example be a surface intended for printing. In addition to clay or pigment, the coating may comprise a binder, such as a rubber or starch. The rubber may be a synthetic rubber, such as styrene-butadiene rubber or stryrene-acrylate rubber.

When preparing coating composition, the synthetic rubber is normally provided in the form of latex.

The coat weight may for example be 5-20 g/m$^2$, such as 8-20 g/m$^2$.

The coating is preferably applied to one side of the first or the second stretchable paper layer before the laminate is formed. The layer having the coating provided on one side may have a coating of a small amount (such as 0.5-5 g/m$^2$) of CMC or starch provided on the other side.

The final paper laminate of the present disclosure may for example have a thickness (ISO 534) of 300-800 µm, such as 400-800 µm, and/or a grammage (ISO 536) of 300-700 g/m$^2$, such as 350-600 g/m$^2$.

A blank of the paper laminate may be provided with folding lines, such that it may be folded into a three-dimensional object, such as part of a package (e.g. a lid), a package (e.g. a box) or a sleeve (see the figures).

Further, a display product, e.g. for use in advertising, may be composed of the laminate.

In the blank or the display product, a relief may be formed, e.g. in an embossing line. In the formation of the relief, a portion of the paper laminate is stretched. For example, the maximum depth or height of the relief may be greater than the thickness of the laminate. In one embodiment, the maximum depth or height is at least 1.5, 2 or 3 times the thickness (see FIGS. 1c and 1d).

A package or part thereof comprising at least one wall may be composed of the paper laminate of the present disclosure. The wall may comprise a relief according to the above. Preferably, the package comprises two walls composed of the paper laminate, which walls are joined by an edge defined by a folding line formed in the paper laminate. At least one of the two walls may be provided with the relief.

A box comprising a bottom wall and at least two side walls may be composed of the paper laminate according of the present disclosure. In the box, at least one of the side walls comprises a bulge or relief formed by stretching a portion of the paper laminate. The box may be adapted to enclose a bottle, such as a wine bottle or a whiskey bottle or a bottle for another expensive liquid. Accordingly, the relief in the side wall may show a bottle.

A lid comprising a top wall and at least three side walls may be composed of the paper laminate of the present disclosure. The lid may be part of an openable and closable box, such as a shoe box. The lid may be formed from a blank provided with folding lines, which define the edges where the side walls meet the top wall. In the blank, i.e. before folding, a relief may be formed, e.g. in an embossing line. After folding, the relief may for example appear in the top wall.

EXAMPLES

FIG. 1a shows a paper laminate 100 according to an embodiment of the present disclosure. The laminate 100 comprises a first stretchable paper layer 101 and a second stretchable paper layer 102. The grammage of each of the stretchable paper layers 101, 102 is 100 g/m$^2$. However, the grammage may also be lower (such as 80 g/m$^2$) or higher (such as 150 or 200 g/m$^2$). The stretchable paper layers 101, 102 are composed of FibreForm® (BillerudKorsnäs AB, Sweden). The strechability of FibreForm® is at least 7% in the CD and at least 13% in the MD when measured according to ISO 1924/3. The internal bond strength of FibreForm® is 500-800 J/m$^2$ according to the standard method Tappi 569. The geometric bending resistance of 100 g/m$^2$ FibreForm® is about 5 mN when measured according to the standard ISO 2493 using a bending tester from Lorentzen & Wettre, a bending angle of 15° and a test span length of 50 mm. The bending resistance index, which is the geometric bending resistance divided by the cubed grammage, for FibreForm® is about 5 Nm$^6$/kg$^3$. The density of FibreForm® is about 0.8 g/cm$^3$.

In the laminate 100, an intermediate paper layer 103 comprising one sublayer obtained from TMP pulp and another sublayer obtained from bleached sulphate pulp. The grammage of the TMP sublayer is 140 g/m$^2$ and the grammage of the other sublayer is 50 g/m$^2$. Accordingly, 74% (w/w) of the intermediate paper layer 103 is obtained from TMP and the grammage of the intermediate paper layer 103 is thus 190 g/m$^2$. However, the grammage may be lower (such as 150 g/m$^2$) or higher (such as 200 or 300 g/m$^2$). The intermediate layer 103 is arranged between the first 101 and the second 102 stretchable paper layer. The stretchability (ISO 1924/3) of the intermediate paper layer 103 is 1.3% in the MD and 2.6% in the CD. The internal bond strength of the intermediate paper layer 103 is 120 J/m² according to the standard method Tappi 569. The geometric bending resistance of the intermediate paper layer 103 is about 60 mN when measured according to the standard ISO 2493 using a bending tester from Lorentzen & Wettre, a bending angle of 15° and a test span length of 50 mm, which means a bending resistance index of 8.7 Nm⁶/kg³. If the grammage of the intermediate paper layer 103 is instead 200 g/m², the geometric bending resistance is about 70 mN. The density of the intermediate paper layer 103 is about 0.6 g/cm³.

A first layer 104 of water based glue is applied to glue the first stretchable layer 101 and the intermediate layer 103 to each other. Further, a second layer 105 of water based glue is provided to glue the second stretchable layer 102 and the intermediate layer 103 to each other. The amount of glue in each layer 104, 105 is 10 g/m². However, the amount may be lower or higher.

FIG. 1b shows a paper laminate 150 according to another embodiment of the present disclosure. The laminate 150 comprises a first stretchable paper layer 101, a second stretchable paper layer 102, a first layer 104 of water based glue and a second layer 105 of water based glue as described above in connection with FIG. 1a.

In the laminate 150, an intermediate paper layer 153 obtained from CTMP and Kraft pulp is arranged between and glued to the first 101 and the second 102 stretchable paper layer. The intermediate layer 153 may be composed of a plurality of sublayers. The grammage of the intermediate paper layer 153 is 220 g/m². However, the grammage may be lower (such as 150 or 200 g/m²) or higher (such as 300 g/m²). The stretchability (ISO 1924/3) of the intermediate paper layer 153 is 1.9% in the MD and 6.9% in the CD. The internal bond strength of the intermediate paper layer 153 is 150 J/m² according to the standard method Tappi 569. The geometric bending resistance of the intermediate paper layer 153 is 138 mN when measured according to the standard ISO 2493 using a bending tester from Lorentzen & Wettre and a bending angle of 15° and a test span length of 50 mm, which means that the bending resistance index is 13 Nm⁶/kg³. If the grammage of the intermediate paper layer 153 is instead 200 g/m², the geometric bending resistance is about 100-120 mN. The density of the intermediate paper layer 103 is about 0.77 g/cm³.

Optionally, the laminate 150 further comprises a clay coating layer 156 on the surface of the second stretchable paper layer 102. The clay coating layer 156 improves printability and appearance. The clay coating layer 156 may be formed by coating the second stretchable layer 102 with a coating composition comprising clay and latex before the laminate 150 is formed. The coat weight of the clay coating layer 156 may for example be 15 g/m².

The backside of the first stretchable paper layer 101 may optionally be coated with 1 g/m² CMC. This surface coated with CMC is not exposed in the laminate 150.

FIG. 1c shows the maximum depth d of a cross-section of a relief formed in the laminate 100. The depth d is 1.5 times the thickness t of the laminate.

FIG. 1c shows the maximum height h of a cross-section of a relief formed in the laminate 100. The maximum height h is 1.5 times the thickness t of the laminate.

Figure 2A:
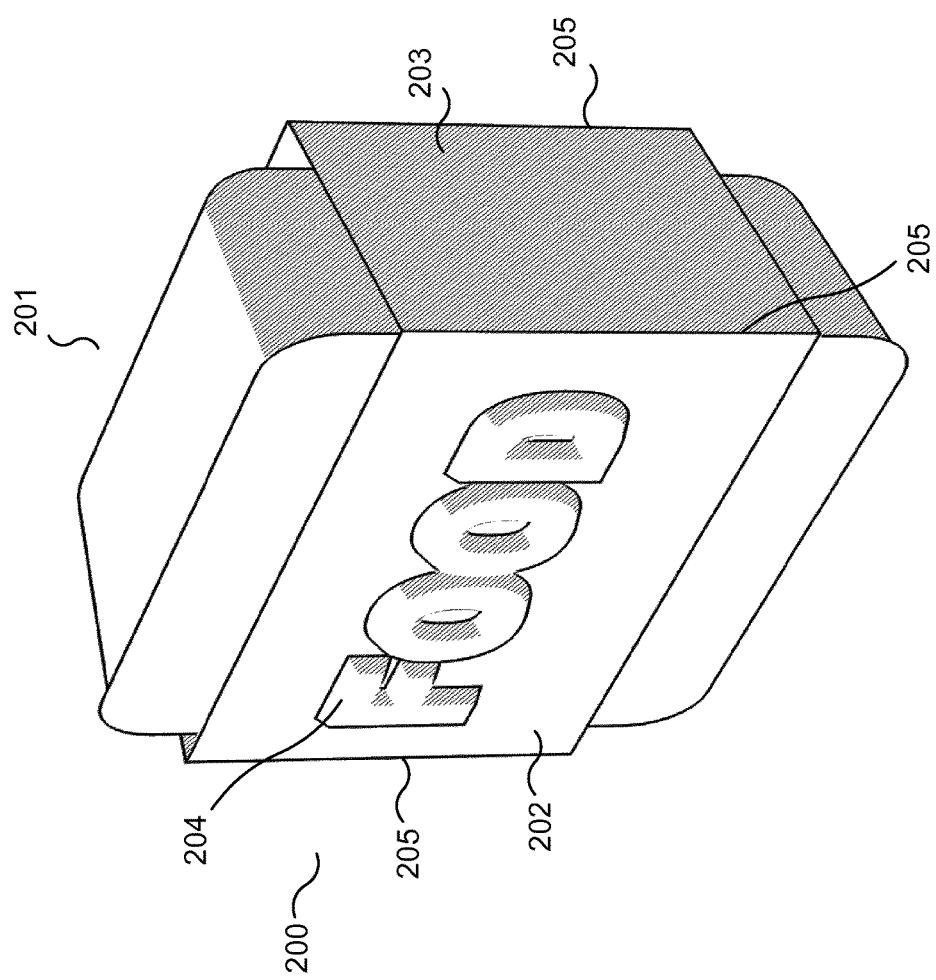
FIG. 2A illustrates a perspective view of a sleeve formed in a paper laminate according to the present disclosure. The sleeve has four walls and is arranged around a food-containing plastic package. A decorative/descriptive relief text has been formed in the upper wall of the sleeve.

FIG. 2A illustrates a sleeve 200 formed in a paper laminate 100/150 according to the present disclosure. The sleeve 200 comprises a top wall 202, two opposing side walls 203 and a bottom wall. The sleeve 200 is arranged around a food-containing plastic package 201. A decorative/descriptive relief text ("FOOD") 204 has been formed in the upper wall 202 of the sleeve 200. The stretchability of the stretchable layers 101, 102 of the laminate allowed the relief text 204 to be formed in the top wall 202. The walls 202, 203 are joined by edges 205 defined by folding lines. The combination of the stretchable layers 101, 102 and the intermediate, "non-stretchable" layer 103/153 allowed the formation of the straight and precise folding lines corresponding to the edges 205.

Figure 2B:
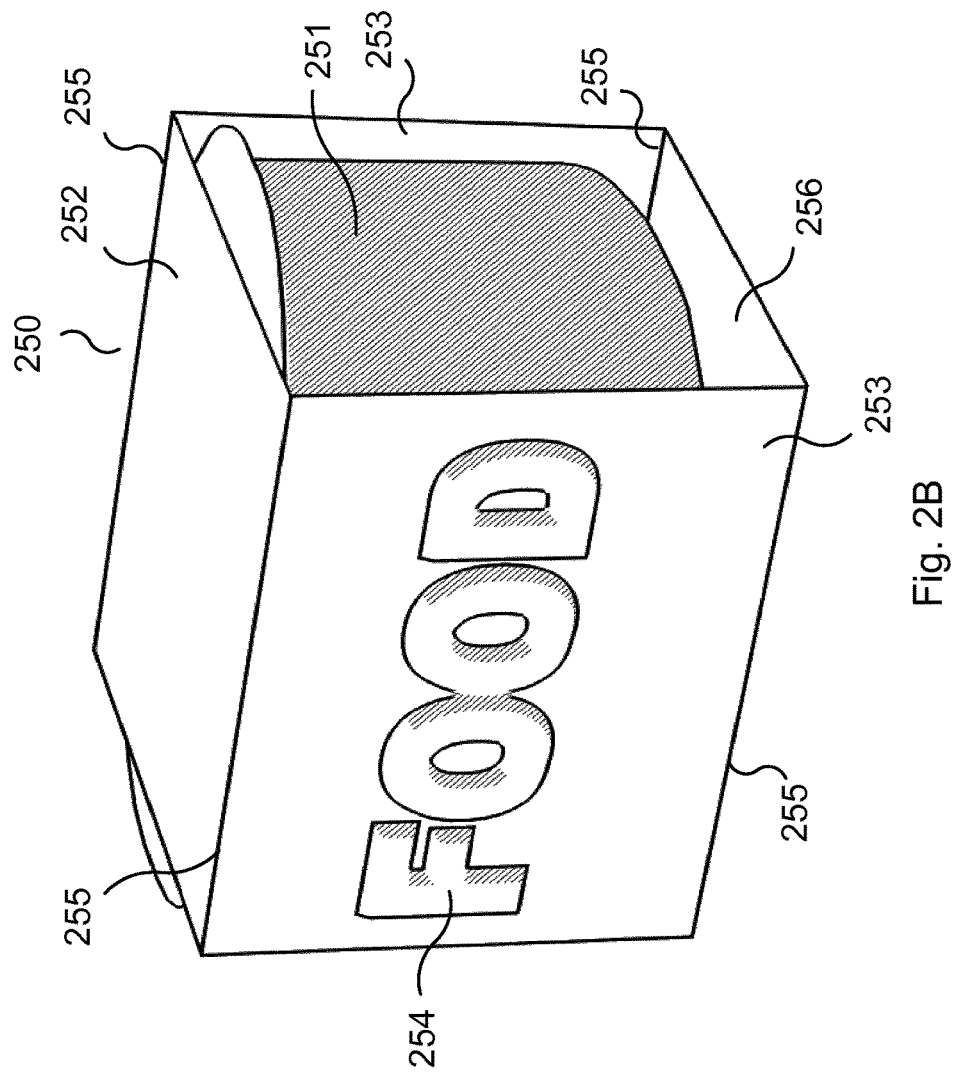
FIG. 2B illustrates a perspective view of another sleeve formed in a paper laminate according to the present disclosure. The sleeve has four walls and is arranged around a food-containing plastic package. A decorative/descriptive relief text has been formed in a side wall of the sleeve.

FIG. 2B illustrates another embodiment of a sleeve 250 formed in a paper laminate 100/150 according to the present disclosure. Again, the sleeve 250 comprises a top wall 252, two opposing side walls 253, and a bottom wall 256. The sleeve 200 is arranged around a food-containing plastic package 251. A decorative/descriptive relief text ("FOOD") 254 has been formed a side wall 253 of the sleeve 250. The stretchability of the stretchable layers 101, 102 of the laminate allowed the relief text 254 to be formed in the side wall 253. The walls 252, 253, 256 are joined by edges 255 defined by folding lines. The combination of the stretchable layers 101, 102 and the intermediate, "non-stretchable" layer 103/153 allowed the formation of the straight and precise folding lines corresponding to the edges 255.

Figure 3:
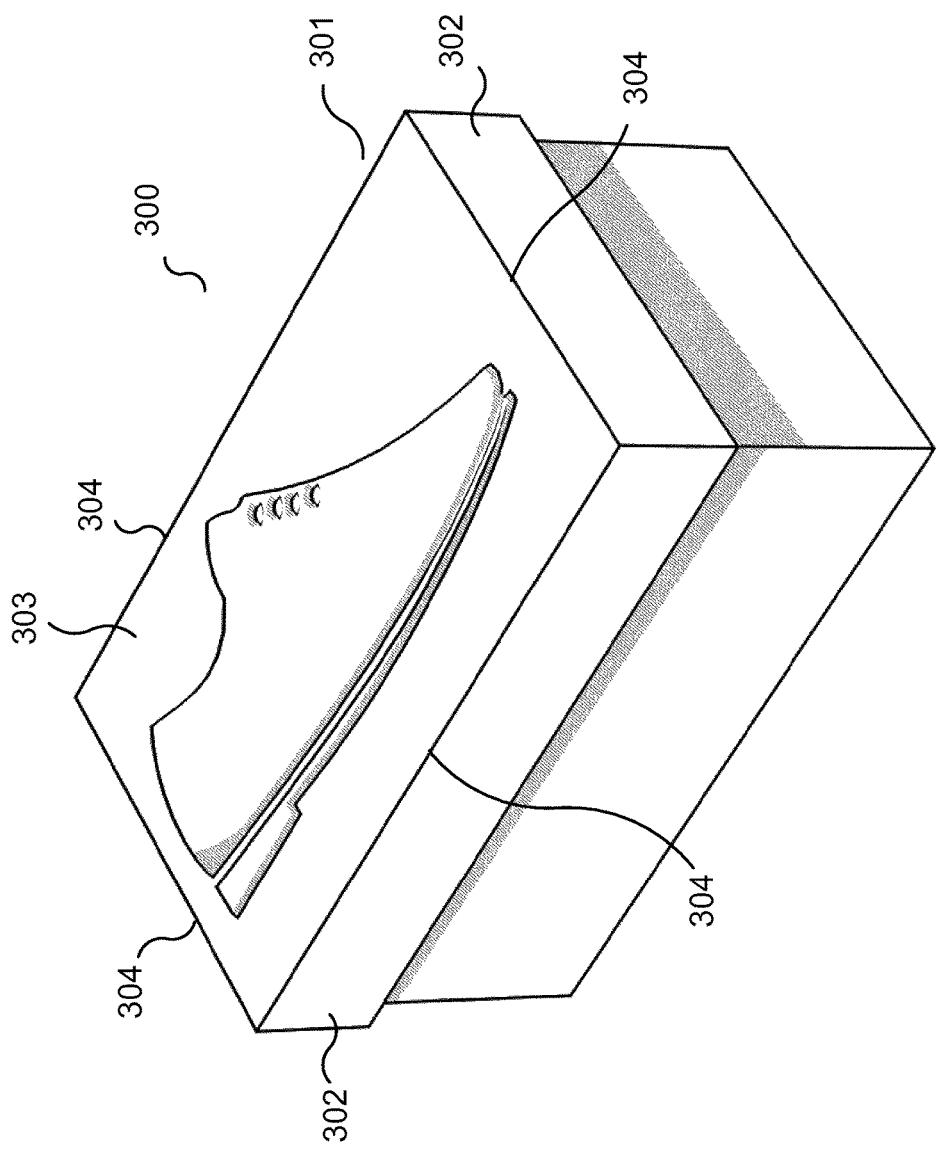
FIG. 3 illustrates a perspective view of a shoe box comprising a lid. The lid, which comprises two pairs of opposing side walls and an upper wall, is formed in a paper laminate according to the present disclosure. A decorative/descriptive relief in the form of a shoe has been formed in the upper wall of the lid.

FIG. 3 illustrates a shoe box 300 comprising a lid 301. The lid 301, which comprises two pairs of opposing side walls 302 and an upper wall 303, is formed in a paper laminate 100/150 according to the present disclosure. A decorative/descriptive relief 304 in the form of a shoe has been formed in the upper wall 303 of the lid 301. The stretchability of the stretchable layers 101, 102 of the laminate allowed the relief 304 to be formed in upper wall 303.

The side walls 302 are joined to the upper wall 303 by edges 304 defined by folding lines. The combination of the stretchable layers 101, 102 and the intermediate, "non-stretchable" layer 103/153 allowed the formation of the straight and precise folding lines corresponding to the edges 304.

Figure 4:
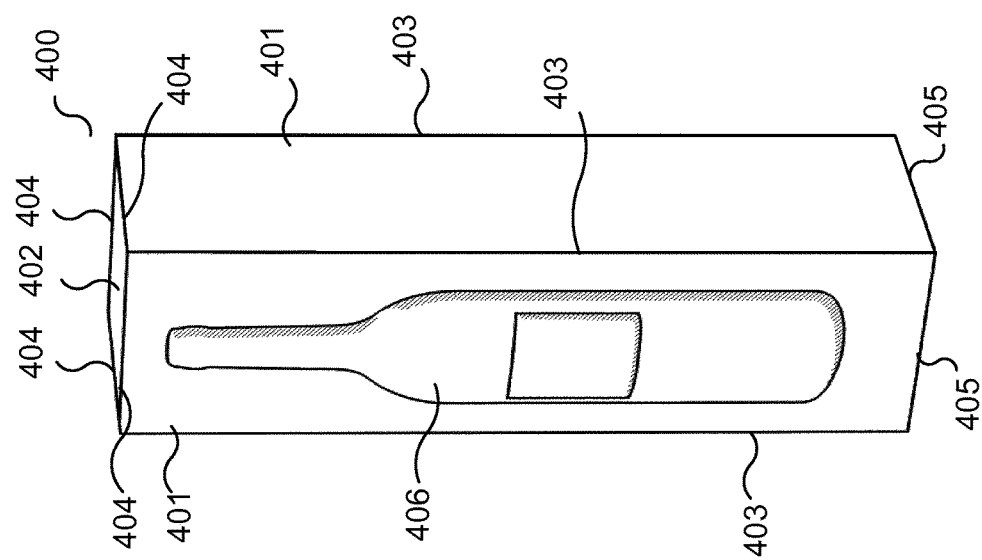
FIG. 4 illustrates a perspective view of a box for a wine bottle. The box, which comprises four side walls, a top wall and a bottom wall, is folded from a blank composed of a paper laminate according to the present disclosure. A decorative/descriptive relief has been formed in a side wall.

FIG. 4 illustrates a box 400 for a wine bottle. The box 400, which comprises four side walls 401, a top wall 402 and a bottom wall, is folded from a blank composed of a paper laminate 100/150 according to the present disclosure. A decorative/descriptive relief 406 in the shape of a wine bottle has been formed in a side wall 401. The stretchability of the stretchable layers 101, 102 of the laminate allowed the relief 406 to be formed. The box comprises four vertical edges 403, four horizontal edges 405 at the top and the four horizontal edges 405 at the bottom. At least three of the four vertical edges 403 are defined by folding lines made in the blank. Further, at least two of the four horizontal edges 404 at the top and at least two of the four horizontal edges 405 at the bottom are defined by folding lines made in the blank. The combination of the stretchable layers 101, 102 and the intermediate, "non-stretchable" layer 103/153 allowed the formation of the straight and precise folding lines corresponding to the edges 403, 404 405.

The invention claimed is:

1. A paper laminate comprising a first stretchable paper layer, a second stretchable paper layer and an intermediate paper layer arranged between the first and the second stretchable paper layer, characterized in that the stretchability (ISO 1924/3) of the first and the second stretchable paper layer is at least 5% in both the machine direction (MD) and the cross direction (CD) and the stretchability (ISO 1924/3) of the intermediate paper layer is less than 3% in the MD and/or the CD.

2. The paper laminate according to claim 1, wherein the stretchability of the first and the second stretchable paper layer is at least 6 or 7% in both the MD and the CD.

3. The paper laminate according to claim 1, wherein the density (ISO 534) of the intermediate paper layer is less than 0.8 g/cm$^3$.

4. The paper laminate according to claim 1, wherein the grammage (ISO 536) of the intermediate paper layer is between 75 and 500 g/m$^2$, such as between 100 and 400 g/m$^2$, such as between 150 and 350 g/m$^2$.

5. The paper laminate according to claim 1, wherein the intermediate layer is at least partly formed from pulp comprising mechanical pulp, thermomechanical pulp (TMP) or chemithermomechanical pulp (CTMP).

6. The paper laminate according to claim 1, wherein the internal bond strength (Tappi 569) the first and the second stretchable paper layer is at least 400 J/m$^2$, such as at least 500 J/m$^2$, such as at least 600 J/m$^2$.

7. The paper laminate according to claim 1, wherein the geometric bending resistance (ISO 2493, bending angle=15°, test span length=50 mm) of the intermediate layer is at least 40 mN, such as at least 50 mN.

8. The paper laminate according to claim 1 having a thickness (ISO 534) of 300-800 μm, such as 400-800 μm, and/or a grammage (ISO 536) of 300-700 g/m$^2$, such as 350-600 g/m$^2$.

9. A blank provided with folding lines, which blank is composed of the paper laminate according to claim 1.

10. A package or part thereof comprising at least one wall composed of the paper laminate according to claim 1.

11. A package or part thereof comprising at least two walls composed of the paper laminate according to claim 1, which walls are joined by an edge defined by a folding lines formed in the paper laminate.

12. The paper laminate, blank or package according to claim 1 comprising a bulge or relief formed by stretching a portion of the paper laminate.

13. The paper laminate, blank or package according to claim 12, wherein the maximum height or the maximum depth of the bulge or relief is at least the same as the thickness of the paper laminate, such as at least 1.5 times the thickness of the paper laminate, such as at least 2 times the thickness of the paper laminate.

14. A box or part thereof comprising a bottom wall and at least two side walls composed of the paper laminate according to claim 1, wherein at least one of the side walls comprises a bulge or relief formed by stretching a portion of the paper laminate.

15. A lid comprising a top wall and at least three side walls composed of the paper laminate according to claim 1, wherein the top wall comprises a bulge or relief formed by stretching a portion of the paper laminate.

* * * * *

UNITED STATES PATENT AND TRADEMARK OFFICE
CERTIFICATE OF CORRECTION

PATENT NO. : 10,086,585 B2
APPLICATION NO. : 15/312774
DATED : October 2, 2018
INVENTOR(S) : Rueterhage et al.

Page 1 of 1

It is certified that error appears in the above-identified patent and that said Letters Patent is hereby corrected as shown below:

On the Title Page

Item (30) Foreign Application Priority Data:
Please correct "14171649" to read -- 14171649.8 --

Signed and Sealed this
Eighth Day of January, 2019

Andrei Iancu
*Director of the United States Patent and Trademark Office*